No. 886,681.  
PATENTED MAY 5, 1908.  
J. DAIN.  
SIDE DELIVERY ROTARY RAKE.  
APPLICATION FILED JUNE 23, 1902. RENEWED NOV. 23, 1904.  
5 SHEETS—SHEET 1.
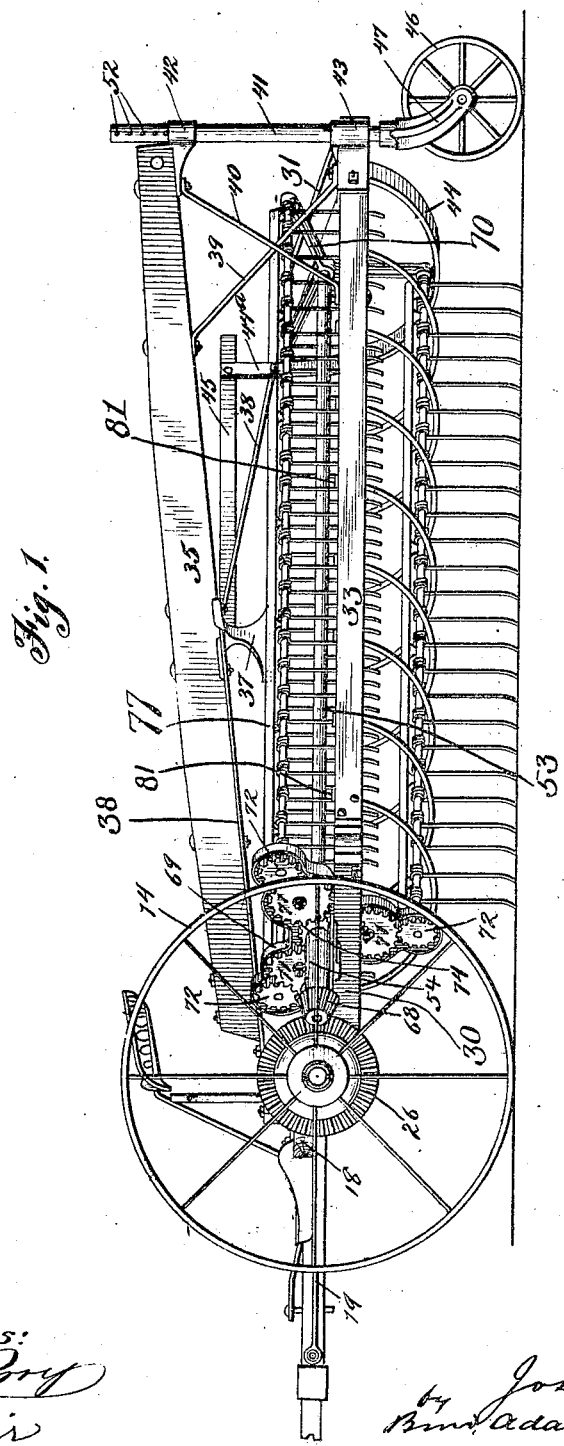

No. 886,681. PATENTED MAY 5, 1908.
J. DAIN.
SIDE DELIVERY ROTARY RAKE.
APPLICATION FILED JUNE 23, 1902. RENEWED NOV. 23, 1904.
5 SHEETS—SHEET 2.
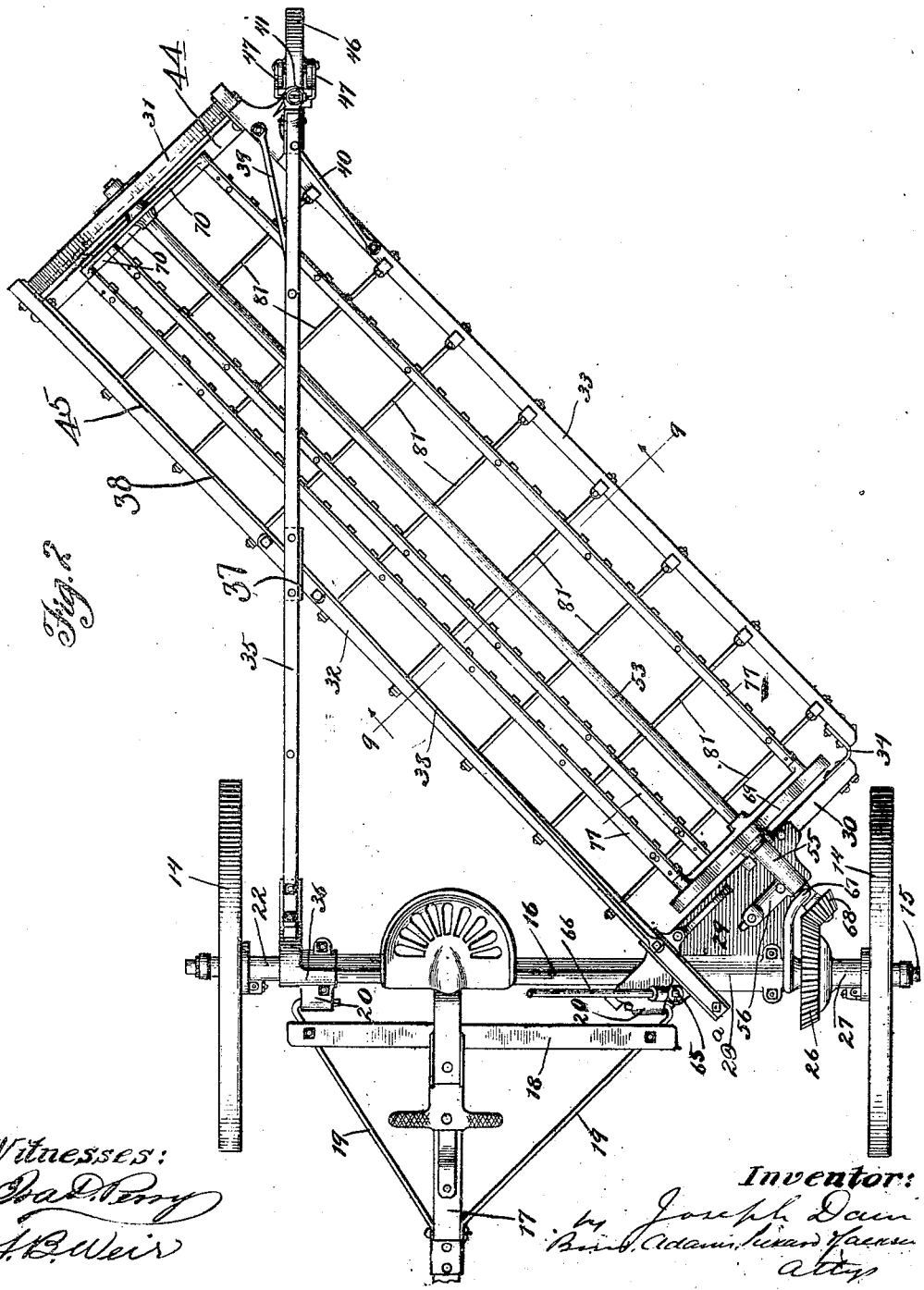
Witnesses:
Inventor:
Joseph Dain No. 886,681. PATENTED MAY 5, 1908.
J. DAIN.
SIDE DELIVERY ROTARY RAKE.
APPLICATION FILED JUNE 23, 1902. RENEWED NOV. 23, 1904.
5 SHEETS—SHEET 3.
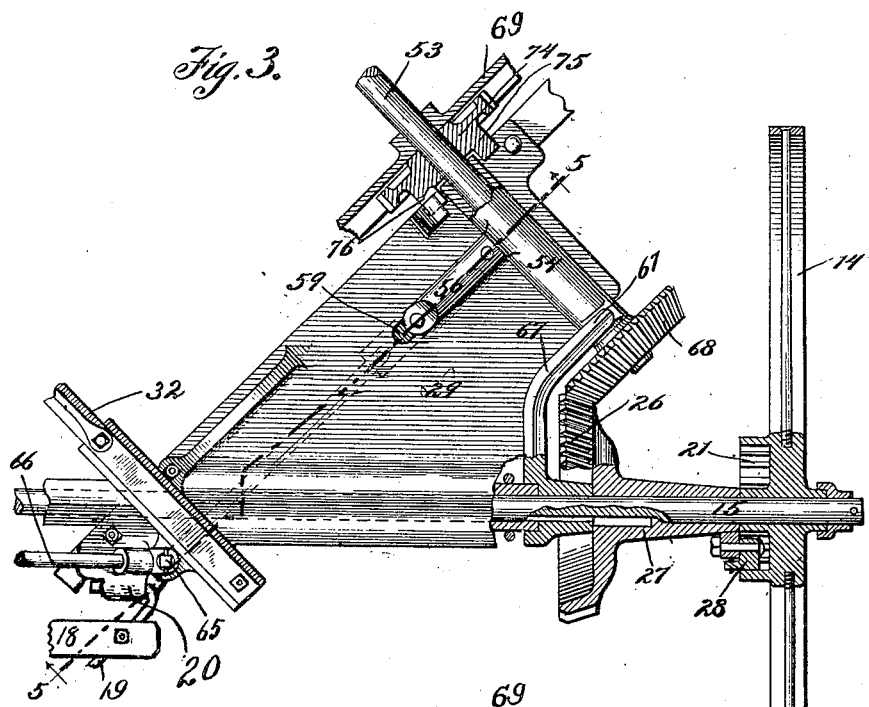
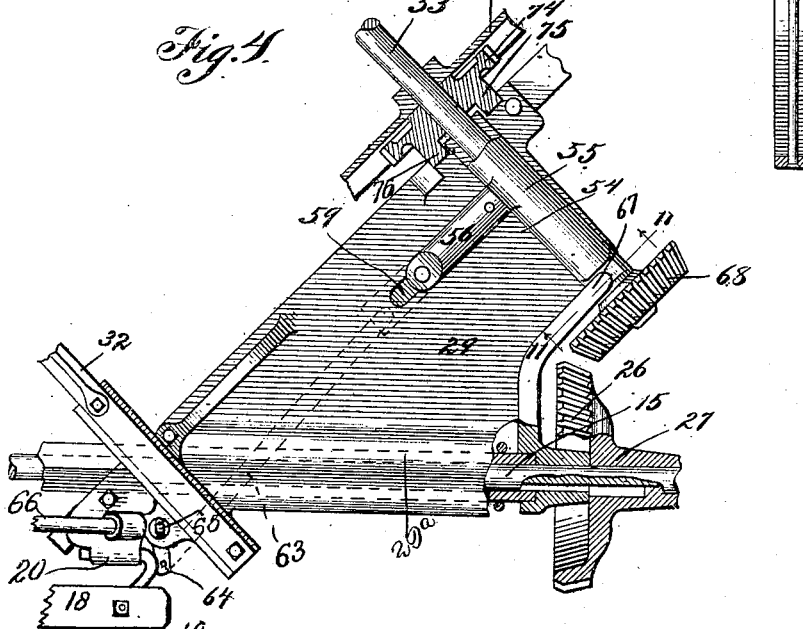

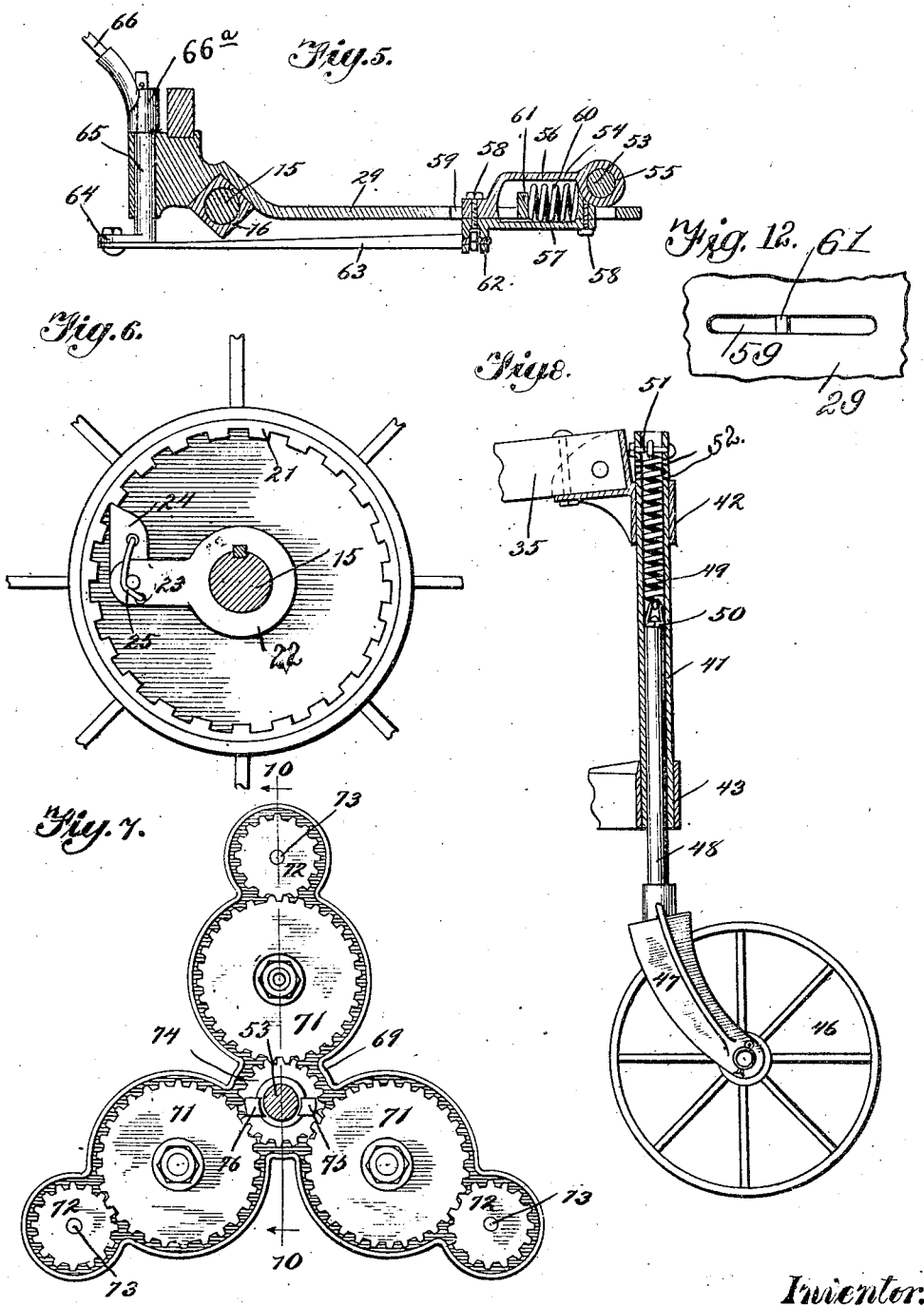

No. 886,681. PATENTED MAY 5, 1908.
J. DAIN.
SIDE DELIVERY ROTARY RAKE.
APPLICATION FILED JUNE 23, 1902. RENEWED NOV. 23, 1904.
5 SHEETS—SHEET 5.
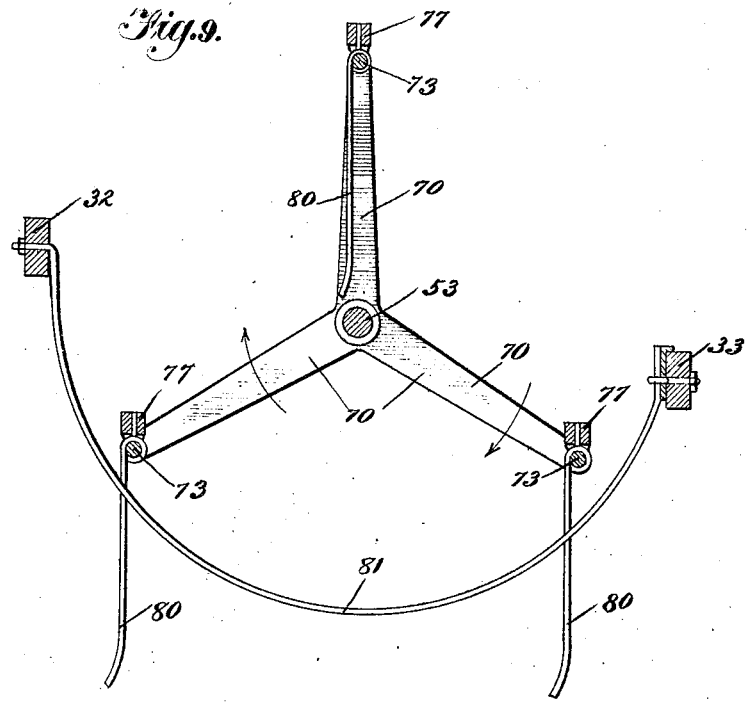
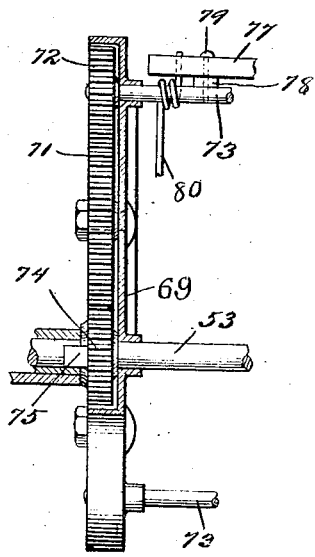
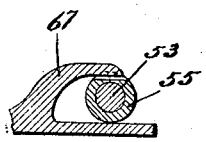
Witnesses:
Inventor:

UNITED STATES PATENT OFFICE.

JOSEPH DAIN, OF OTTUMWA, IOWA.

SIDE-DELIVERY ROTARY RAKE.

No. 886,681.　　　Specification of Letters Patent.　　　Patented May 5, 1908.

Application filed June 23, 1902, Serial No. 112,812.  Renewed November 23, 1904.  Serial No. 234,007.

*To all whom it may concern:*

Be it known that I, JOSEPH DAIN, a citizen of the United States, residing at Ottumwa, in the county of Wapello and State of Iowa, have invented certain new and useful Improvements in Side-Delivery Rotary Rakes, of which the following is a specification, reference being had to the accompanying drawings.

My invention relates to side-delivery rotary-rakes; and one of the objects of the invention is to provide new and improved mechanism by which the teeth of the rotating rake may be constantly carried in a vertical position as the same is rotated, thereby causing the teeth of the rake to properly engage the hay, or other material to be raked, and rake it to one side in windrows; also causing the teeth to be disengaged from the hay, insuring its proper delivery.

Another object of my invention is to provide a new and improved frame for such hay-rakes, in which the weight is sustained on three supports,—that is to say, upon the two drive wheels and the rear or caster-wheel.

My invention has for a further object the improvement of rotary hay-rakes in sundry particulars hereinafter set forth.

That which I regard as new will be set forth in the claims.

In the drawings,—Figure 1 is a side elevation; Fig. 2 is a top or plan view; Fig. 3 is an enlarged detail, being a top or plan view of the supporting-plate and gears, showing the gears in engaging position; Fig. 4 is an enlarged detail of a portion of the same parts shown in Fig. 3, showing the gears disengaged; Fig. 5 is an enlarged detail, being a section on line 5—5 of Fig. 3; Fig. 6 is an enlarged detail, being a view of the clutch-mechanism connected with the carrying-wheels; Fig. 7 is an enlarged detail, being an end view of one of the frame-spiders, showing the operating gears; Fig. 8 is an enlarged detail, being a view of the caster-wheel and supporting mechanism; Fig. 9 is an enlarged detail, being a section on line 9—9 of Fig. 2; Fig. 10 is an enlarged detail, being a section on line 10—10 of Fig. 7; Fig. 11 is an enlarged detail, being a section on line 11—11 of Fig. 4; and Fig. 12 is a detail view of a supporting plate to which a part of the rake frame is secured.

Referring to the drawings,—14—14 indicate carrying-wheels, which are journaled upon an axle 15. As shown in Fig. 1, the axle 15 registers with, and, in the best embodiment of my invention, is inclosed by and journaled in a cross-bar 16 through which it extends. The cross-bar 16 is preferably a sleeve squared in cross-section to form a firm support for other parts hereinafter described.

17 indicates a tongue, which is supported by means of a cross-bar 18 and braces 19. The braces 19 are connected by suitable supports 20 with the cross-bar 16.

The hub of each of the carrying-wheels 14 is provided upon its inner face with a circular set of ratchet-teeth 21.

22 indicates a cylindrical block which is keyed to one end of the axle 15. As is best shown in Fig. 6, this cylindrical block is provided with an arm 23 upon which is pivoted a pawl 24, which, by means of a spring 25, is caused to engage with the ratchet-teeth 21 in such a way that when the machine is driven forward the rotation of the carrying-wheel 14 will cause the block 22 to revolve and rotate the axle 15; and when the machine is backed or the wheel 14 rotated in the other direction the parts will ratch back, so that the axle 15 will not be rotated.

26 indicates a gear, which is provided with a hub 27 and is keyed or otherwise secured to the other end of the axle 15. The hub 27 is provided with a spring-actuated pawl 28, which engages with the ratchet-teeth 21 of the other carrying-wheel 14 in the same manner,—that is to say, in such a way that when the machine is driven forward the pawl 28 will engage with the teeth 21 and cause the axle 15 to rotate; but when the wheel 14 is rotated backward, by backing the machine or otherwise, the pawl will ratch back over the teeth. The rear surface of the gear 26 is recessed, as shown in Figs. 3 and 4.

29 indicates a supporting plate which is secured at its front edge, by means of a clip 29ª, to the bar 16. The rake-frame of the machine consists of end-bars 30—31, a front bar 32 and a rear bar 33. The end bar 30 is bolted or otherwise secured to the plate 29. The front bar 32 is bolted at its forward end above the plate 29. The rear bar 33 is secured at its forward end to the end bar 30, by means of a strap 34. The front bar 32 and rear bar 33 are bolted or otherwise secured to the end bar 31.

35 indicates a beam, the front end of which is secured by a clip 36 to the cross-bar 16.

37 indicates a bracket which is supported by the front bar 32. The beam 35 is bolted to the bracket 37.

38 indicates a truss-brace, which passes over the bracket 37 between it and the beam 35, and its ends are bolted to the front bar 32 near the extremities of said front bar 32.

39—40 indicate braces which are secured to the rear bar 33 and to the beam 35.

41 indicates a sleeve which is secured in suitable supports 42—43 carried, respectively, by the beam 35 and rear bar 33.

44 indicates a brace-strap, which is approximately semicircular in shape, one end being bolted to the outer or rear end of the rear bar 33 and the other end to the outer or rear end of the front bar 32. The strap 44 is provided with an upward-projecting portion 44$^a$.

45 indicates a brace, one end of which is bolted or otherwise secured to the bracket 37 and the other end to the upper portion of the upward-projecting portion 44$^a$ of the brace-strap 44.

46 indicates a caster-wheel journaled in a fork 47. The fork 47 is provided with an upward-projecting post 48, which is journaled in the sleeve 41.

49 indicates a spiral spring, which is contained in the sleeve 41 above the post 48, and is secured to and bears upon a swivel 50 on the upper end of the post 48. The other end of the spring 49 is looped around and bears upon a pin 51, which is inserted through suitable openings 52 in the sleeve 41. As shown in the drawings, there are several of these openings arranged at different distances from the top of the sleeve 41, whereby the position of the spring and of the caster-wheel may be varied by inserting the pin 51 in one or the other of said openings. The spring 49 thus affords a suitable spring-seated bearing for the caster-wheel 46; and it is obvious that the height at which that end may be carried from the ground may be adjusted by the adjustment of the pin 51 in the holes 52.

As thus described, it is obvious that the rake-frame of the machine is supported at its forward end by the carrying-wheel nearest the plate 29, and that the other end of the rake-frame is supported by means of the caster-wheel 46; and that by means of the bar 35 and its connections above described the rake-frame will also be supported by the other carrying-wheel 14; thus affording a triple support for said rake-frame,—that is to say, the two carrying wheels and the caster-wheel.

53 indicates a shaft, the outer end of which is journaled in a suitable bearing on the end bar 31 of the rake-frame. The other end of said shaft 53 is journaled in a slide-box 54, supported by the plate 29, and best shown in Figs. 3, 4 and 5. The slide-box consists, as is best shown in said figures, of a journal portion 55,—in which one end of the shaft 53 turns, as above set forth—a forward-projecting portion 56 and a lower portion 57. The journal portion 55 and forward-projecting portion 56 are preferably formed integral, as is shown in Fig. 5, and the parts 55 and 56 are fastened to the lower portion 57 by means of screws 58. The lower part of the forward-projecting portion 56 is adapted to rest within and slide longitudinally of itself in a suitable slot 59 in the plate 29, and is held in place in said slot by means of the lower portion 57 being broader than the slot and projecting beyond its sides, as is shown in dotted lines in Figs. 3 and 4.

60 indicates a spiral spring, which bears at one end upon the sliding box 54 and at the other end upon a cross-piece 61 in the slot 59. The spring 60 by its expansion tends to normally force the parts backward toward the rear end of the slot. The lower portion 57 is provided with a downward-depending lug 62.

63 indicates a connecting rod, one end of which is secured to the lug 62 and the other end to a crank-arm 64 on a pin 65 which is journaled in the front portion of the plate 29.

66 indicates a lever which is provided with a head 66$^a$. The head 66$^a$ is provided with a suitable opening by means of which it is secured to the top of the pin 65. By means of the turning of the lever 66, the crank-arm 64 is rotated, and by means of the connecting rod 63 the sliding journal-box 54 may be moved forward upon the plate 29, so as to cause the engagement of the gear wheels hereinafter described. The outer end of the journal-portion 55 of the slide-box 54 is further held in position by means of a projecting finger 67, which is secured to or formed integral with the plate 29 and projects backward above the journal-box 54, as is best shown in Fig. 11, so that the journal-box slides between the lower portion of the finger 67 and the surface of the plate 29.

68 indicates a beveled gear, which is keyed to or otherwise secured upon the forward end of the shaft 53, and is adapted to engage and mesh with the gear 26, when the parts are thrown into engagement by the operation of the lever above described, whereby when the gear 26 is rotated by the action of the carrying wheels 14, as above described, the shaft 53 will be rotated with it.

The shaft 53 carries upon its ends spiders 69—70. The spider 69, as is best shown in Fig. 7, is shaped so as to house and carry three sets of gears 71—72. The gears 71 are journaled upon the spider 69. The gears 72 are keyed or otherwise secured to the ends of shafts 73. The shafts 73 are journaled in the spiders 69 and 70.

74 indicates a stationary gear which as shown in Fig. 7, is of the same diameter as the gears 72, and is loosely journaled upon the shaft 53 against the outer surface of the spider 69 and centrally thereof, so as to mesh with the three gears 71. The gear 74 is located, as is best shown in Figs. 3 and 4, between the outer surface of the spider 69 and the adjacent edge of the plate 29, and is provided with two lugs 75—76, which are adapted to bear against the upper surface of the plate 29 and prevent the rotation of the gear 74.

77 indicates bars, which are secured a short distance from the shafts 73 by means of blocks 78 and pins 79 passing through the bars 77 and the shafts 73.

80 indicates rake-teeth, which are located at suitable intervals along the shafts 73 and are secured thereto by coiling their upper ends around the shafts 73 and then passing the short ends left after the coiling through the bars 77, thus giving the teeth proper resiliency and spring.

It is obvious that when the shaft 53 is rotated by the action of the carrying wheels 14, as above described, it will carry with it the spiders 69—70, thus revolving the rake-carrying bars 73 around the axis of the shaft 53. At the same time, the gear 74 being stationary, as above described, by means of the gears 71—72 the rake-teeth 80 will be maintained constantly in the same vertical position throughout the entire revolution, causing them to engage the scattered hay, or other material to be raked, and move it forward into windrows as the machine is driven forward.

81 indicates guards. The guards 81 are approximately semicircular in form, as best shown in Fig. 9, and are secured to the front and rear bars 32—33. The function of the guards 81 is to cause any hay that might otherwise not be freed from the rake-teeth to be freed therefrom as the rake-carrying bars revolve.

It will be noticed, from the above description, that the rake-teeth, when they come into position to engage the hay, descend into the hay substantially vertically, and, engaging the hay, move forward still in a vertical position, and, when they have reached their extreme forward point in the rotation, rise vertically from the hay, insuring a much better distribution of the hay into windrows than could be the case if the rake-teeth were not constantly held in said vertical position during their rotation about the shaft 53. It is also obvious that when it is desirable to drive the machine along without operating or rotating the rake, the gear wheels 68 and 26 may be disconnected by swinging the lever 66, thus disengaging the parts and preventing the rake from being rotated. When it is desired to have the rotating rake operate, to rake hay or other material, said gears are thrown into engagement by swinging the said lever in the opposite direction.

From the above description it will be seen that the rake-frame is supported from the wheel-frame in a very effective and simple manner. Extending as it does diagonally backward from the wheel-frame there are practically four points of the rake-frame to be supported,—namely, the two outer or rear and the two inner or forward corners of the frame, and these are supported upon the three points,—namely, the caster-wheel and the two driving-wheels,—of the wheel-frame, as above set forth. The extreme rear point of the rake-frame is supported directly by the caster-wheel. The other corner, at the same end of the rake-frame, is supported by the bracket 37, which, as is said above, is connected with the front bar 32 of the rake-frame, and with the beam 35. The beam 35, being connected as above described with the extreme rear corner of the rake-frame, and being connected at its front end with the bar 16 by means of the clip 36, will rigidly hold the bar 16 and prevent its turning. The cross-bar 16 of course is made sufficiently strong to resist torsional strain. The extreme front corner of the rake-frame is supported, as is said above, directly upon the plate 29. The other front corner, nearest the driving-wheel, is supported by being secured to the plate 29, which is secured by means of the clip 29$^a$ to the bar 16. The bar 16, being rigidly held and prevented from turning, will, by means of this connection, firmly hold the plate 29, which will thus act as a support for the forward corner of the rake-frame nearest the driving-wheel. The rake-frame is thus thoroughly supported at all its points upon the three points of support,—to wit, the two driving-wheels and the caster-wheel.

I have shown the cross-bar 16 as being rectangular in section and the several parts secured thereto by clips which fit the said rectangular bar. It is obvious, however, that a bar of any polygonal cross-section might be used, with clips to correspond, or even that the bar might be made circular or of any other suitable shape in cross-section and the clips keyed or bolted or otherwise secured thereto, and the same end be accomplished; and I therefore do not wish to limit myself to the use of a bar rectangular in section, with clips shaped to correspond thereto.

I have shown the revolving rake of my device as provided with three rods carrying rake-teeth, and this is the form in which I prefer to construct it. It is obvious, however, that it might be provided with more or less than three rake-tooth carrying-rods without departing from the spirit of my invention, and I therefore do not confine myself to that number of bars for carrying the rake-teeth of the revolving rake.

That which I claim as my invention and desire to secure by Letters Patent is,—

1. A rake, comprising a wheel-frame, a rake-frame secured thereto at one end and extending rearwardly therefrom, raking means carried by said rake-frame, means actuated by the forward movement of the rake for operating said raking means, and means yieldingly supporting the rear end portion of said rake-frame.

2. The combination with a wheel-frame provided with two carrying-wheels, of a rake-frame secured at one end to said wheel-frame and extending diagonally rearward therefrom, and a caster-wheel yieldingly and adjustably carried upon the rear end of said rake-frame, substantially as described.

3. The combination with the wheel-frame, of a rake-frame secured at one end thereto and extending diagonally rearward therefrom, a sleeve secured to the rear end of said rake-frame, a brace-beam secured at its front end to said wheel-frame, near its middle portion to said rake-frame, and at its rear end to said sleeve, and a caster-wheel yieldingly and adjustably mounted in said sleeve, substantially as described.

4. The combination with a wheel-frame, of a rake-frame secured at one end thereto and extending diagonally rearward therefrom, a sleeve secured to the rear end of said rake-frame, a brace-beam secured at its front end to said wheel-frame, near its middle portion to said rake-frame, and at its rear end to said sleeve, a post journaled in said sleeve and provided with a fork at its lower end, a caster-wheel journaled in said fork, and a spring carried in said sleeve and bearing upon the top of said post, substantially as described.

5. In a hay-rake, the combination with a wheel-frame, an axle journaled therein, wheels journaled on said axle, and a beveled gear secured to said axle, of a rake-frame carried by said wheel-frame, a slide-box carried by said rake-frame, a shaft journaled at one end in said rake-frame and at the other end in said slide-box, a beveled gear secured to the end of said shaft and adapted to mesh with said first-named gear, a rotary-rake carried by said shaft, and means for moving said slide-box on said rake-frame to throw said beveled gears into and out of engagement with each other, substantially as described.

6. The combination with a wheel-frame, an axle journaled thereon, carrying-wheels journaled on said axle, ratchet-mechanism connected to said axle and said wheels and adapted to rotate said axle when said wheel-frame is moved forward, a gear secured to said axle, and a rake-frame carried by said wheel-frame, of a plate secured to said wheel-frame and said rake-frame, a sliding journal-box carried on said plate, a rotatable rake journaled on said rake-frame, a gear carried on said rotatable rake and adapted to mesh with said gear on said axle, means for sliding said sliding journal-box on said plate to engage and disengage said gears, and means for holding the rake-teeth on said rotatable rake in a substantially vertical position as said rake is rotated, substantially as described.

7. In a hay-rake, the combination with a wheel-frame, an axle journaled therein, wheels journaled on said axle, and a beveled gear secured to said axle, of a rake-frame carried by said wheel-frame, a slide-box carried by said rake-frame, a shaft journaled at one end in said rake-frame and at the other end in said slide-box, a beveled gear secured to the end of said shaft and adapted to mesh with the first-named gear, a rotatable rake carried by said shaft, means for moving said slide-box on said rake-frame to throw said beveled gears into and out of engagement with each other, and means for holding said rake-teeth on said rotatable rake in a substantially vertical position as said rake is rotated, substantially as described.

8. The combination with a wheel-frame, an axle journaled therein, carrying-wheels journaled on said axle, ratchet-mechanism connected with said axle and said wheels and adapted to rotate said axle when said wheel-frame is moved forward, a gear secured to said axle, and a rake-frame carried by said wheel-frame, of a shaft journaled at one end in said rake-frame and at the other end in a slide-box carried by said rake-frame, a gear mounted upon the end of said shaft and adapted to mesh with the gear on said axle, means for moving said slide-box to engage and disengage said gears, supports secured to said shaft, revoluble shafts journaled in said supports and carrying rake-teeth secured thereto, a gear journaled on said shaft and held against rotation, and intermediate gear-mechanism connected with said shaft and with said teeth-supporting shafts, whereby the rake-teeth will be held in substantially a vertical position as their carrying shafts are revolved around said first-named shaft, substantially as described.

JOSEPH DAIN.

Witnesses:
 C. E. PICKARD,
 HELEN M. COLLIN.